(12) United States Patent
Jensen et al.

(10) Patent No.: US 11,174,845 B2
(45) Date of Patent: Nov. 16, 2021

(54) ASSEMBLY SYSTEM FOR ASSEMBLING OF A FIRST WIND TURBINE COMPONENT OF A WIND TURBINE AND SECOND WIND TURBINE COMPONENT OF THE WIND TURBINE AND METHOD FOR ASSEMBLING OF A WIND TURBINE BY USING THE ASSEMBLY SYSTEM

(71) Applicant: Siemens Gamesa Renewable Energy A/S, Brande (DK)

(72) Inventors: Jens Hald Jensen, Give (DK); Thorkil Munk-Hansen, Fredericia (DK); Jesper Bjerre Pedersen, Torring (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 30 days.

(21) Appl. No.: 16/491,516

(22) PCT Filed: Nov. 28, 2017

(86) PCT No.: PCT/EP2017/080594
§ 371 (c)(1),
(2) Date: Sep. 5, 2019

(87) PCT Pub. No.: WO2018/162101
PCT Pub. Date: Sep. 13, 2018

(65) Prior Publication Data
US 2020/0018288 A1    Jan. 16, 2020

(30) Foreign Application Priority Data
Mar. 7, 2017    (DE) .................... 10 2017 203 690.7

(51) Int. Cl.
*F03D 13/10*    (2016.01)
*F03D 13/20*    (2016.01)

(52) U.S. Cl.
CPC ............. *F03D 13/10* (2016.05); *F03D 13/20* (2016.05)

(58) Field of Classification Search
CPC ............ F05B 2230/61; F05B 2240/916; F03D 13/20; F03D 13/10
See application file for complete search history.

(56) References Cited

U.S. PATENT DOCUMENTS 8,052,396 B2 * 11/2011 Wobben .................. F03D 13/10
416/244 R
8,319,363 B2 * 11/2012 Song ....................... F03D 13/10
290/44

(Continued)

FOREIGN PATENT DOCUMENTS

CN    105927478 A    9/2016
CN    106415005 A    2/2017

(Continued)

OTHER PUBLICATIONS

JP-5746409-B1 machine translation (Year: 2015).*

(Continued)

*Primary Examiner* — Jacob J Cigna
*Assistant Examiner* — Michael W Hotchkiss
(74) *Attorney, Agent, or Firm* — Schmeiser, Olsen & Watts LLP

(57) ABSTRACT

An assembly system and method for assembling at least one first wind turbine component assembly section of a first wind turbine component of a wind turbine and at least one second wind turbine assembly section of a second wind turbine component of the wind turbine is provided. The assembly system includes at least one assembly assisting element for joining the two wind turbine components. The assembly assisting element is arranged at the first wind turbine component and the second wind turbine component. The assembly assisting element is arranged at the first wind (Continued)

turbine component and at the second wind turbine component. The assembly assisting element includes at least one guiding element for guiding of the first wind turbine component assembly section and/or for guiding of the second wind turbine assembly section. The wind turbine components are a blade, a hub, a nacelle, a generator or a tower (segments).

11 Claims, 3 Drawing Sheets

(56) References Cited

U.S. PATENT DOCUMENTS

| | | | | |
|---|---|---|---|---|
| 8,596,614 | B2* | 12/2013 | Numajiri | B66C 23/207 254/329 |
| 8,997,350 | B2* | 4/2015 | Trede | F03D 13/10 29/889.2 |
| 9,068,555 | B2* | 6/2015 | Arocena De La Rua | F03D 1/0658 |
| 9,394,886 | B2* | 7/2016 | Yenigun | F03D 80/70 |
| 9,415,978 | B2* | 8/2016 | Fenger | B66D 3/08 |
| 9,890,022 | B2* | 2/2018 | Neumann | F03D 1/0675 |
| 10,054,111 | B2* | 8/2018 | Modrego Jimenez | F03D 13/20 |
| 10,113,530 | B2* | 10/2018 | Neumann | B66C 1/66 |
| 2006/0151767 | A1* | 7/2006 | Wobben | F03D 13/10 254/334 |
| 2007/0290426 | A1* | 12/2007 | Trede | F03D 13/10 269/1 |
| 2010/0028152 | A1* | 2/2010 | Numajiri | F03D 13/10 416/146 R |
| 2010/0139062 | A1* | 6/2010 | Reed | F03D 13/10 29/23.51 |
| 2010/0254813 | A1* | 10/2010 | Dawson | B66D 1/60 416/146 R |
| 2011/0042632 | A1* | 2/2011 | Van Berlo | F03D 13/10 254/264 |
| 2012/0073118 | A1* | 3/2012 | Bywaters | F03D 9/25 29/596 |
| 2012/0217089 | A1* | 8/2012 | Fenger | F03D 80/50 182/2.1 |
| 2012/0228881 | A1* | 9/2012 | Siegfriedsen | F03D 13/20 290/55 |
| 2013/0318789 | A1* | 12/2013 | Gabeiras | F03D 13/10 29/889.7 |
| 2014/0010658 | A1* | 1/2014 | Nielsen | F03D 80/50 416/204 R |
| 2014/0109407 | A1* | 4/2014 | Neumann | F03D 1/0658 29/889.1 |
| 2014/0255186 | A1* | 9/2014 | Yenigun | F03D 7/0224 416/1 |
| 2014/0360015 | A1* | 12/2014 | Lohan | B66C 23/207 29/889.1 |
| 2015/0048043 | A1* | 2/2015 | Laurens | B66C 23/207 212/179 |
| 2015/0226179 | A1* | 8/2015 | Neumann | F03D 13/10 29/889.1 |
| 2015/0232307 | A1* | 8/2015 | Holloway | F03D 80/50 414/800 |
| 2016/0040649 | A1* | 2/2016 | Smith | B66C 23/207 415/121.3 |
| 2017/0045029 | A1 | 2/2017 | Senthoorpandian et al. | |
| 2017/0067447 | A1* | 3/2017 | Reynolds | B66C 1/108 |
| 2018/0003157 | A1* | 1/2018 | Ebbesen | F03D 80/50 |
| 2019/0181730 | A1* | 6/2019 | Christensen | F03D 9/25 |
| 2020/0332769 | A1* | 10/2020 | Jensen | F03D 13/10 |

FOREIGN PATENT DOCUMENTS

| | | | | |
|---|---|---|---|---|
| EP | | 2369174 | A1 | 9/2011 |
| EP | | 2786953 | A1 | 10/2014 |
| JP | | 5746409 | B1 * | 7/2015 |
| WO | | 2008088408 | A2 | 7/2008 |
| WO | | 2012065613 | A1 | 5/2012 |
| WO | | 2014020637 | A1 | 2/2014 |
| WO | WO-2017162824 | A1 * | 9/2017 | ........... F03D 1/0675 |

OTHER PUBLICATIONS

Non-English Chinese Office Action for Application No. 201780090520.8, dated Aug. 26, 2020.
International Search Report dated Feb. 21, 2018 for Application No. PCT/EP2017/080594.

* cited by examiner

ASSEMBLY SYSTEM FOR ASSEMBLING OF A FIRST WIND TURBINE COMPONENT OF A WIND TURBINE AND SECOND WIND TURBINE COMPONENT OF THE WIND TURBINE AND METHOD FOR ASSEMBLING OF A WIND TURBINE BY USING THE ASSEMBLY SYSTEM

CROSS-REFERENCE TO RELATED APPLICATIONS

This application claims priority to PCT Application No. PCT/EP2017/080594, having a filing date of Nov. 28, 2017, which is based off of DE Application No. 10 2017 203 690.7, having a filing date of Mar. 7, 2017, the entire contents both of which are hereby incorporated by reference.

FIELD OF TECHNOLOGY

The following refers to an assembly system for assembling of a first wind turbine component of a wind turbine and second wind turbine component of the wind turbine. In addition, the following refers to a method for assembling a wind turbine by using the assembly system.

BACKGROUND

The assembling of a wind turbine comprises inter alia an assembling of a blade of the wind turbine to the hub of the wind turbine. This can be done after the assembling a nacelle of the wind turbine including the hub to a tower of the wind turbine.

The increasing size of wind turbines requires longer towers that increase the horizontal movement of the components, for instance the wind turbine rotor blades or the hub of the wind turbine, when being installed.

This increase of (oscillation) relative movement of theses wind turbine components to each other during the installation process gives challenges when merging the components during the lifting and installation process.

SUMMARY

An aspect relates to provide a possibility for reducing the relative movement of wind turbine components to each other during the installation process.

For that, an assembly system for assembling at least one first wind turbine component assembly section of a first wind turbine component of a wind turbine and at least one second wind turbine assembly section of a second wind turbine component of the wind turbine is provided. The assembly system comprises at least one assembly assisting element for a bringing together of the two wind turbine components. The assembly assisting element is adapted to be arranged at the first wind turbine component and at the second wind turbine component. The assembly assisting element comprises at least one guiding element for guiding of the first wind turbine component assembly section and/or for guiding of the second wind turbine assembly section. The guiding element comprises at least one elongated connection element. For instance, the elongated connection element can span between the two wind turbine components.

In addition, a method for assembling of a wind turbine with following steps is provided: a) Providing of at least one first wind turbine component of a wind turbine with at least one first wind turbine component assembly section, providing of at least one second wind turbine component of the wind turbine with at least one second wind turbine component assembly section and providing of at least one above described assembly system; and b) Assembling of the two wind turbine component assembly sections with the aid of the assembly assisting element.

The assembly sections of the first and the second wind turbine components are connected (joint) together. With the aid of the elongated connection element the two wind turbine components can be connected together (e.g. a rope or wire). By that, the movements of the wind turbine components can by synchronized.

In an exemplary embodiment, the elongated connection element comprises at least one rope and/or at least one wire. With the aid of the rope and/or with the aid of the wire the first wind turbine component assembly section and second wind turbine assembly section are connected together such, that the relative movement of these components towards each other is reduced. The wire or ropes can be torque or tension controlled.

At least two elongated connection elements can be crosswise arranged such that a crossing area of the two elongated connection elements between the two wind turbine assembly sections results. The elongated connection elements comprise longitudinal dimensions. The orientations of the longitudinal dimensions are crosswise arranged. By this measure, a very stable assembling together of the two wind turbine components is possible.

With the aid of the assembly system two wind turbine components of any kind can be assembled together. In an exemplary embodiment, the first wind turbine component and/or the second wind turbine component are selected from the group consisting of wind turbine tower, wind turbine blade, wind turbine nacelle, wind turbine generator and wind turbine hub. Segments or sections of these wind power components can also be regarded as wind power components. For instance, the first wind turbine component is a wind turbine blade and the second wind turbine component is a wind turbine hub. The wind turbine blade can be horizontally or vertically oriented during an installation including the assembling to the wind turbine hub.

The assembling can comprise additional fastening measures. For instance, there are assembly bolts of the first wind turbine component assembly section and assembly bolt holes of the second wind turbine component assembly section. During the arranging the assembly bolts are arranged in the assembly bolt holes. An arranging of the assembly bolts in the assembly bolt holes can be assisted by the assembly assisting element.

In a further exemplary embodiment, the first wind turbine component assembly section and/or the second wind turbine component assembly section comprise a plurality of assembly bolts and the second wind turbine component assembly section and/or the first wind turbine component assembly section comprise a plurality of assembly bolt holes in which the assembly bolts can be arranged during the assembling. The arranging of the assembly bolts in the assembly bolt holes is assisted by the assembly assisting element.

For instance, the first wind turbine component is a blade and the first wind turbine assembly section is a section of a blade root (blade root assembly section) of the wind turbine blade. The second wind turbine component is a hub of the wind turbine. The second wind turbine assembly section is a wind turbine hub assembly section. Assembly bolts are located in the blade root assembly section and the assembly bolt holes are located in the wind turbine hub assembly section. Alternatively, the assembly bolts are located in the wind turbine hub assembly section and the assembly bolt holes are located in the blade root assembly section. Mixtures of the different described arrangements of the assembly bolts and the assembly bolts holes are possible, too.

The assembly assisting element can act passively. Alternatively, the assembly assisting element can actively influence the assembling of the wind turbine components. For this, the assembly assisting element comprises at least one actuator. The actuator comprises at least one winch. With the winch additional components of the assembly assisting element like wires or ropes can be guided or rolled up.

In an exemplary embodiment, the assembling assisting element comprises at least one storage device for storing the rope and/or for storing the wire. The storage device comprises at least one stick for winding the rope and/or for winding the wire. Again, with the stick the wires or ropes can be rolled up.

The assembly assisting element, the guiding element and or the storage device can be located at any position of the wind turbine components (wind turbine blade, wind turbine hub or wind turbine tower of the wind turbine). The assembly assisting element and/or the guiding element and/or the elongated connection element and/or the storage device can be located in an interior of the first wind turbine component, in an interior of the second wind turbine component and/or between the first wind turbine assembly section and the second wind turbine component assembly section.

After the assembling, the assembly assisting element can be removed of the assembled wind turbine. For instance, the assembly assisting element is available after the assembling of the wind turbine components at the wind turbine. In an exemplary embodiment, the assembly assisting element can remain attached to the wind turbine after the assembling. So, additional steps for the removing of the assembly assisting element from the wind turbine are not necessary.

BRIEF DESCRIPTION

Some of the embodiments will be described in detail, with reference to the following figures, wherein like designations denote like members, wherein.

DETAILED DESCRIPTION

Figure 1:
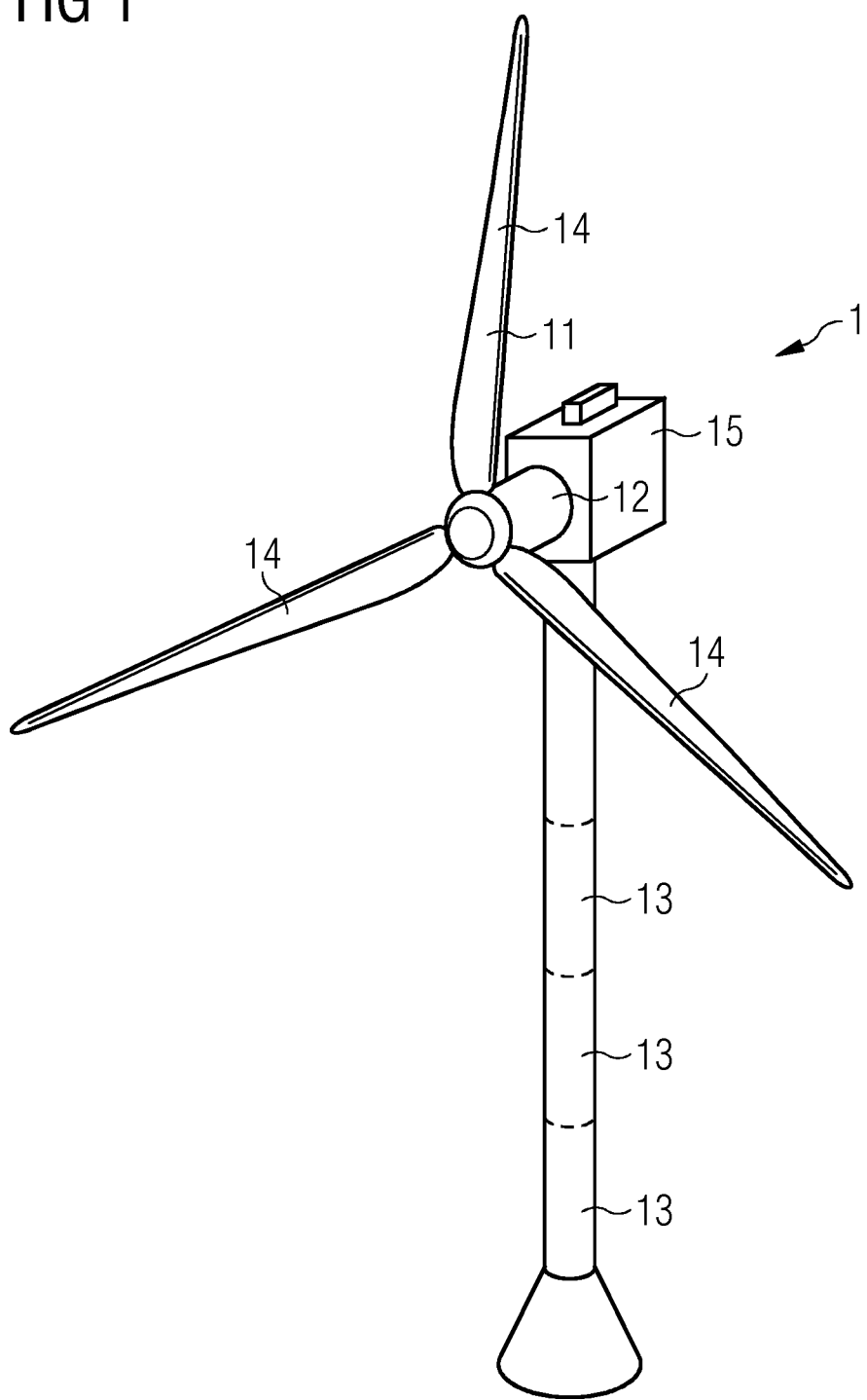
FIG. 1 shows a wind turbine.
Figure 2:
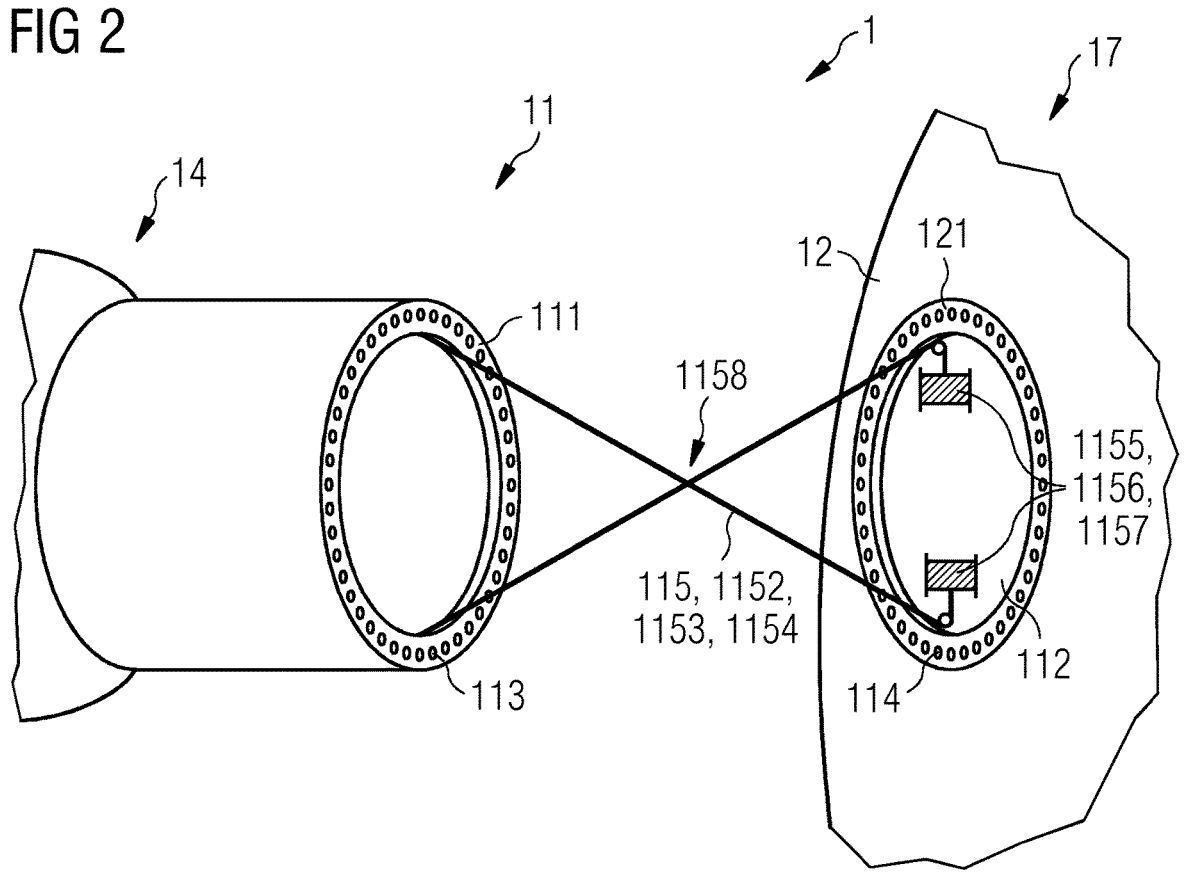
FIG. 2 shows details of the assembly system for assembling a wind turbine blade and a wind turbine hub.

Embodiments of the invention refer to an assembly system 10 for a wind turbine 1. With embodiments of the invention the assembling 100 of at least one first wind turbine component assembly section 111 of a first wind turbine component 11 and a second wind turbine component section 112 of a second wind turbine component 12 is possible.

Figure 5:
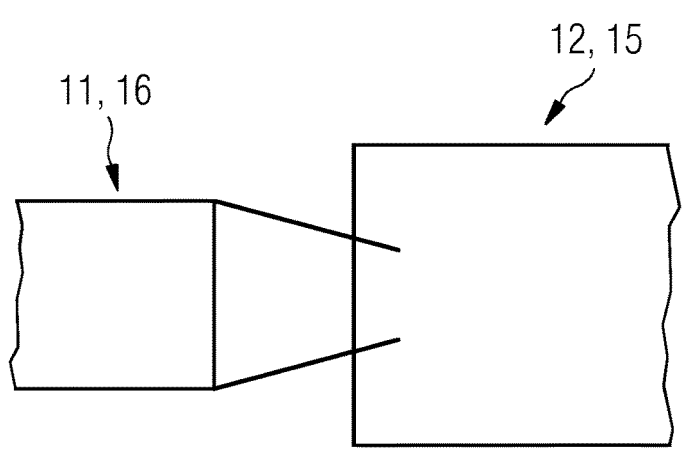
FIG. 5 shows an alternative embodiment of the invention with the assembling of a wind turbine generator in a wind turbine nacelle.

The first wind turbine component 11 is a wind turbine blade 14. The first wind turbine component assembly section 111 is a wind turbine blade assembly section. The second wind turbine component 12 is a wind turbine hub. The second wind turbine component assembly section 121 is a wind turbine blade assembly section (Alternatively, the first wind turbine 11 component is a wind turbine generator 16 and the second wind turbine component 12 is a wind turbine nacelle 15 (see FIG. 5)). Not shown is the possibility that one of the wind turbine components is a wind turbine tower segment 13.

The blade root assembly section 111 comprises a plurality of assembly bolts 113. The wind turbine hub assembly section 121 comprises a plurality of assembly bolt holes 114 in which the assembly bolts 113 can be arranged during the assembling 100.

The assembly system 10 comprises at least one assembly assisting element 115 for assisting a bringing together 1151 of the two wind turbine components 11 and 12. The assembly assisting element 115 is adapted to be arranged at the first wind turbine component 11 and at the second wind turbine component 12. The assembly assisting element 15 comprises at least one guiding element 1152 for guiding of the first wind turbine component assembly section 111 and/or for guiding of the second wind turbine assembly section 121.

The assembly assisting element 115 comprises at least one guiding element 1152 for guiding of the blade root assembly section 111 and for guiding of the wind turbine hub assembly section 121. The assembly assisting system 115 and the guiding element 1152 comprise 2, 3, 4 ore more ropes 1153 or wires 1154, respectively. The ropes 1553 and/or the wires 1554 can be crosswise arranged such that a crossing area 1158 of the two ropes 1153 and wires 1154 between the two wind turbine assembly sections 111 and 121 results.

In order to have a possibility for the tuning of the assembling the assembly assisting element 115 comprises actuators 1155 which are located in an interior 112 of the wind turbine hub 17. The actuators 1155 comprise winches for the winding of the ropes 1153 and the wires 1154. The actuators and/or winches are controlled by at least one not shown controller in such a way that the movement of the wind turbine blade 17 is gradually synchronized with the movement of the wind turbine hub 14 while the wind turbine blade 14 is being gradually moved by the winches towards the wind turbine hub 17.

In addition, storage devices 1156 for storing the ropes 1553 and/or for storing the wires 1154 are located in the interior 112 of the wind turbine hub 12. The storage devices comprise sticks 1157 for winding the ropes 1553 and/or for winding the wires 1154.

The wind turbine blade is assembled having the wind turbine blade lifted and placed in a horizontal position. Alternatively the wind turbine blade installation is carried out having the wind turbine blade vertically placed or in a specific chosen angle different from horizontal and vertical.

Figure 3:
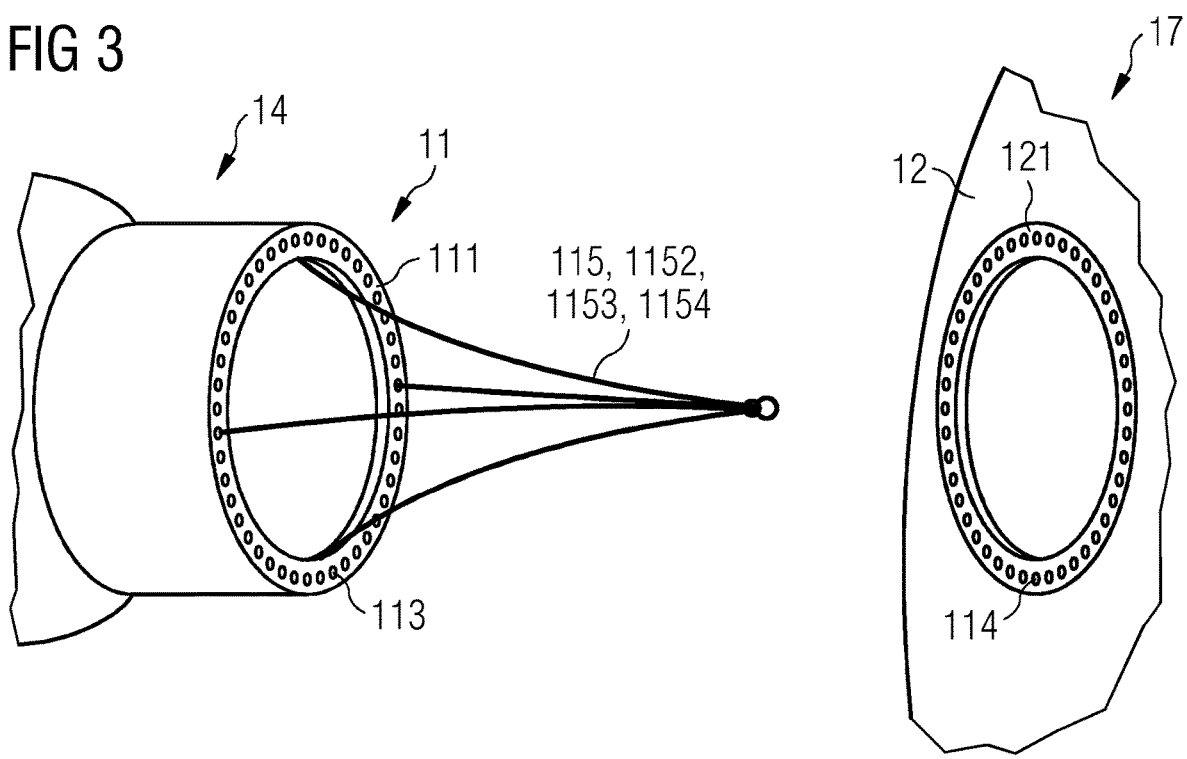
FIG. 3 shows details of the assembly system for assembling a wind turbine blade and a wind turbine hub.
Figure 4:
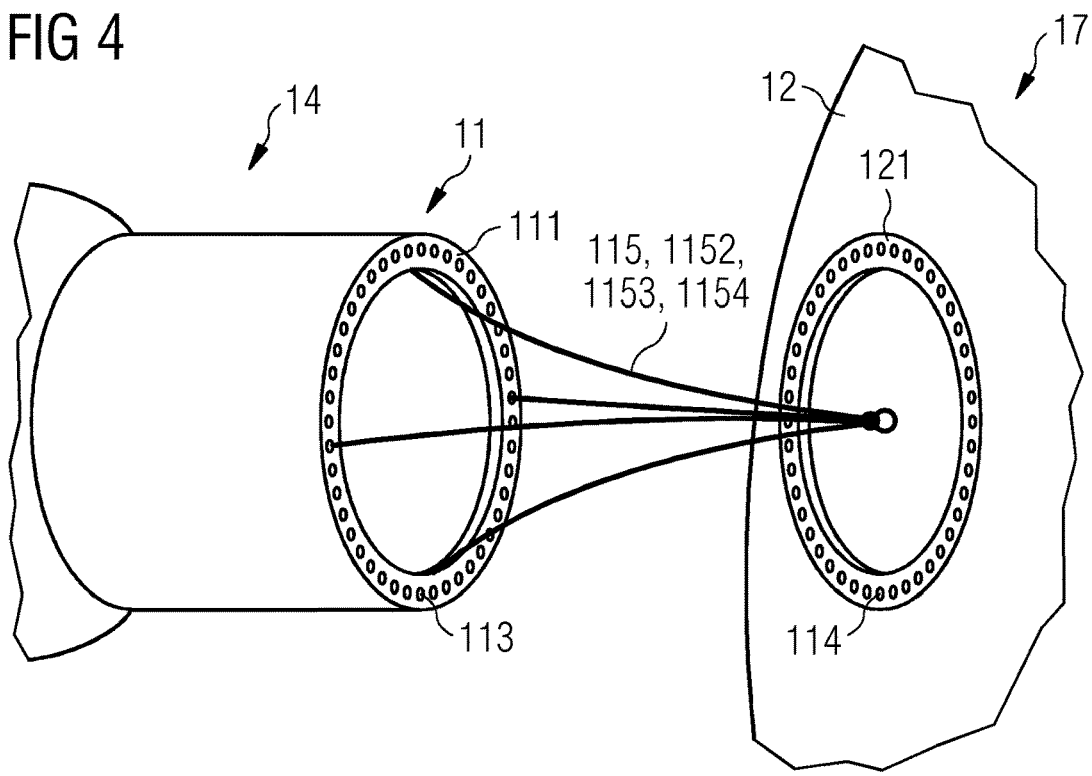
FIG. 4 shows manufacturing steps including an arranging of assembly bolts in assembly bolt holes.
Figure 6:
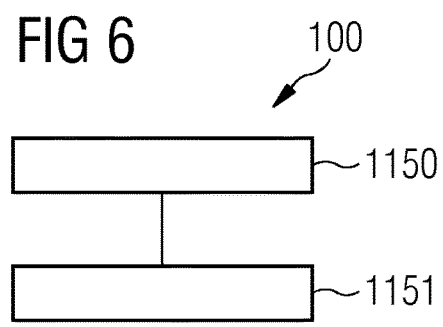
FIG. 6 shows the method for assembling a wind turbine.

The method for assembling a wind turbine 1 comprises with following steps (see FIGS. 3, 4 and 6: a) Providing 1150 of at least one first wind turbine component 11 (wind turbine blade 14) of a wind turbine 1 with at least one first wind turbine component assembly section (wind turbine blade assembly section) 111, providing 1150 of at least one second wind turbine component 12 (wind turbine blade 17) of the wind turbine (1) with at least one second wind turbine component assembly section (wind turbine hub assembly section) 121 and providing of at least one above described assembly system 10 and b) assembling 1151 of the two wind turbine component assembly sections 111 and 121 with the aid of the assembly assisting element 115.

Thereby, the assembly bolts 113 of the wind turbine blade assembly section (first wind turbine component assembly section 111) are arranged in the assembly bolt holes 114 of the wind turbine hub assembly section (second wind turbine component assembly section 121). This is assisted by the assembly assisting element 115 of the assembly system 10. After the arranging the assembly bolts 113 are fastened in the assembly bolt holes 114.

The assembly assisting element 115 remains attached to the wind turbine 1 after the assembling 100. Alternatively, the assembly assisting element 115 is removed from the wind turbine. For that the assembly assisting element is available through the wind turbine hub 12.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An assembly system for assembling of at least one first wind turbine component assembly section of a first wind turbine component of a wind turbine and at least one second wind turbine component assembly section of a second wind turbine component of the wind turbine, wherein the assembly system comprises at least one assembly assisting element for assisting a bringing together of the two wind turbine components;

the assembly assisting element is adapted to be arranged at the first wind turbine component and at the second wind turbine component;

the assembly assisting element comprises at least one guiding element for guiding of the first wind turbine component assembly section and/or for guiding of the second wind turbine component assembly section; and the guiding element comprises at least two elongated connection elements;

wherein each of the at least two elongated connection elements include a longitudinal dimension extending from a first arrangement location on the first wind turbine component assembly section to a corresponding second arrangement location on the second wind turbine component assembly section, wherein a first arrangement location of a first elongated connection element is positioned diagonally opposite to a corresponding second arrangement location along an axis extending parallel to an attachment location between the first wind turbine component and second wind turbine component, and opposite to another second arrangement location of a second elongated connection element, and wherein the first elongated connection element and second elongated connection element are configured to cross one another along the axis and between the first wind turbine component assembly section and second wind turbine component assembly section while the first wind turbine component assembly section and second wind turbine component assembly section are brought together at the attachment location.

2. A method for assembling a wind turbine with following steps:

a) providing of at least one first wind turbine component of a wind turbine with at least one first wind turbine component assembly section, providing of at least one second wind turbine component of the wind turbine with at least one second wind turbine component assembly section and providing of at least one assembly system according to claim 1 and b) assembling of the two wind turbine component assembly sections with the aid of the assembly assisting element.

3. The assembly system according to claim 1 wherein the assembly assisting element can remain attached to the wind turbine after the assembling.

4. The assembly system according to claim 1, wherein the first wind turbine component and/or the second wind turbine component are selected from the group consisting of wind turbine tower, wind turbine blade, wind turbine nacelle, wind turbine generator and wind turbine hub.

5. The assembly system according to claim 1, wherein the first wind turbine component assembly section and/or the second wind turbine component assembly section comprise a plurality of assembly bolts and the second wind turbine component assembly section and/or the first wind turbine component assembly section comprise a plurality of assembly bolt holes in which the assembly bolts are arranged during the assembling.

6. The assembly system according to claim 1, wherein the assembly assisting element comprises at least one actuator.

7. The assembly system according to claim 6, wherein the actuator comprises at least one winch.

8. The assembly system according to claim 1, wherein the at least two elongated connections element comprises at least one rope and at least one wire.

9. The assembly system according to claim 8, wherein the assembling assisting element comprises at least one storage device for storing the at least one rope and/or for storing the at least one wire.

10. The assembly system according to claim 9, wherein the at least one storage device comprises at least one stick for winding the at least one rope and/or for winding the at least one wire.

11. The assembly system according to claim 9, wherein the assembly assisting element and/or the guiding element and/or the elongated connection element and/or the at least one storage device is located in an interior of the first wind turbine component, in an interior of the second wind turbine component and/or between the first wind turbine component assembly section and the second wind turbine component assembly section.

\* \* \* \* \*